(12) United States Patent
Gasparraj

(10) Patent No.: US 7,428,444 B2
(45) Date of Patent: Sep. 23, 2008

(54) METHOD FOR UNDER-SIZING ELECTRODES FOR POLYGONAL ORBIT ELECTRIC DISCHARGE MACHINING

(75) Inventor: Edwin Gasparraj, Mason, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 11/278,050

(22) Filed: Mar. 30, 2006

(65) Prior Publication Data
US 2007/0239311 A1 Oct. 11, 2007

(51) Int. Cl.
G06F 19/00 (2006.01)
B23H 1/00 (2006.01)
B23H 1/08 (2006.01)

(52) U.S. Cl. .................. 700/162; 219/69.15; 219/69.16; 219/69.17

(58) Field of Classification Search .................. 700/162; 219/69.15, 69.16, 69.17
See application file for complete search history.

(56) References Cited

U.S. PATENT DOCUMENTS

| | | | | |
|---|---|---|---|---|
| 5,247,151 A | * | 9/1993 | Hagerman | 219/69.17 |
| 5,354,961 A | * | 10/1994 | Diot et al. | 219/69.13 |
| 6,454,930 B1 | * | 9/2002 | Derighetti | 205/645 |
| 2002/0162824 A1 | * | 11/2002 | Tricarico et al. | 219/69.17 |

FOREIGN PATENT DOCUMENTS

EP 0 737 931 A2 10/1996

OTHER PUBLICATIONS

K. R. Mahajan, G. E. Knoppers, J. A. J. Oosterling and C. A. van Luttervelt, Knowledge based design of EDM electrodes for mould cavities pre-machined by high-speed milling, Journal of Materials Processing Technology, vol. 149, Issues 1-3, 14th Interntaional Symposium on Electromachining (ISEM XIV), Jun. 10, 2004, pp. 71-76.*
X.M.Ding, Y.Y.H.Fuh, K.S.Lee: "Computer aided EDM electrode design" Computer Aided EDM Electrode Design, [Online] Jan. 23, 2002 (Jan. 23, 2002), pp. 1-9, XP002457582.
Cimatron: "Cimatrone Electrode" Cimatrone Electrode, [Online] Mar. 15, 2006 (Mar. 15, 2006), pp. 1-2, XP002457583.
K.R. Mahajan, G.E.Knoppers, J.A.J.Oosterling, C.A. Van Luttervelt: "Knowledge Based Design of EDM Electrodes for Mould Cavities Pre-Machined by High-Speed Milling" Knowledge.

* cited by examiner

Primary Examiner—Michael D. Masinick
(74) Attorney, Agent, or Firm—James I. Harlan

(57) ABSTRACT

A system, method, and computer program for designing an electrode for electric discharge machining, comprising identifying a cavity in a three-dimensional design; calculating a direct negative boolean of said cavity to define a general form for an electrode; determining an orbit path for said electrode, wherein said orbit path has a plurality of vertices corresponding to a plurality of instances with said three-dimensional design; subtracting a plurality of instances from said general form for said electrode whereby an orbit gap is removed from said general form electrode; and applying a constant face offset to said general form for said electrode having said orbit gap and appropriate means and computer-readable instructions.

17 Claims, 13 Drawing Sheets

METHOD FOR UNDER-SIZING ELECTRODES FOR POLYGONAL ORBIT ELECTRIC DISCHARGE MACHINING

TECHNICAL FIELD

This presently preferred embodiment relates generally to EDM (electro-discharge machining). More specifically, the presently preferred embodiment relates to the method of undersizing electrodes for polygonal orbit EDM.

BACKGROUND

Manufacturers use electrical discharge machining (EDM) to remove portions of metal too hard to machine with conventional milling techniques, or to form intricate cavities that could not be easily machined using conventional milling processes in a cost effective manner. During a series of consecutive sparks that produce a series of micro-craters on an electrically conductive work piece in the presence of an energetic dielectric fluid, the EDM process vaporizes material along a cutting path. Wire-cut EDM and die-sinking EDM are the two common types utilized by manufacturers today. In wire-cut EDM, a thin single strand metal wire is fed through a work piece that is constantly fed from a spool and held between an upper and lower guide.

In die-sinking EDM, a graphite or copper electrode is machined into a desired shape and fed into a work piece to erode a cavity in a dielectric fluid. The eroded cavity is bigger than the electrode because of spark gap and EDM orbit. Spark gap is caused by the EDM erosion process itself and is proportional to the amount of current used. The EDM orbit moves the electrode in a programmed path which creates room for the dielectric fluid and eroded material to escape.

The shape and size of the orbital path is based primarily on the size and shape of the electrode. The most commonly used orbits are spherical, circular, square, star and custom. The shape of the cavity being machined is dependent on the shape and size of the orbit. For example, if an electrode with a square cross section is moved in a circular orbit, the resulting cavity would have rounded corners along the vertical edges. Because the size and shape of the resulting cavity should meet particular dimensions, the electrode is often under-sized based on the chosen orbit.

To virtually mill a part, a CAD application, for example NX(tm) by UGS Corp., is utilized to define the electrode path of orbit. To design the actual electrode, however, there are commercially available electrode design packages, for example PS-Electrode by Delcam and Quick Electrode by Cimatron, that completely ignore the steps required for orbit and gap compensation. When designing the electrodes, features in cavities are identified, a negative core is modeled, tangential extensions are formed, and then electrode base and holders are selected. The most important and challenging step in the electrode design process is compensating the geometry for spark gaps and EDM orbits, which said commercially available packages fail to provide. The user is therefore left to use manual offsets and manipulate machining tools to undersize the electrode and trick the milling machine to form an electrode that is smaller than the electrode originally designed to compensate for the inherent deficiencies present today. For example, in circular and spherical orbits, the electrode making process is tricked by under-sizing programmed tools and over-sizing actual milling tools. Circular and spherical orbits are limited since they cannot produce sharp corners in the cavity.

Spherical orbit under-sizing is the easiest to manage, as the spark gap and orbit gap are uniformly applied to the entire electrode geometry. This uniform application is accomplished by using either face offsets or applying negative stock at the machine tool. (during NC programming, negative stock is applied by programming with a smaller tool.) There are severe limitations to both the methods: (1) face offsets are not always reliable, (2) negative offsets can only be applied with tools with corner radii bigger than the offset value, (3) the final cavity will have corner radii as big as 50% of orbit_distance+finish_spark_gap, and (4) smaller corner radii in the original cavity could result in sharp corners on the under-sized electrode that could increase electrode wear and (5) Spherical orbits take at least twice as long as other orbits to erode the desired cavity.

A second category of orbit path is the circular orbit that is technically more complicated to achieve than under-sizing for spherical orbits. In the circular orbit, the orbit gap is applied uniformly in a X-Y plane. There is no orbit gap along a Z axis. Rather, the spark gap is applied uniformly in all directions. If the electrode geometry is simple, most users manage the electrode geometry by offsetting select faces from the electrode. The management of electrode geometry is also accomplished by manipulating the programmed tool while machining the electrode. The limitations are: (1) face offsets are less reliable than in spherical orbit under-sizing, (2) face offsets have to be individually calculated and administered for inclined faces, which makes it even less reliable, (3) the final cavity will have vertical corner radii as big as 50% of orbit_distance+finish_spark_gap, (4) small vertical corner radii in the original cavity could result in sharp corners on the under-sized electrode that could increase electrode wear, and (5) manipulating tool diameter while machining the electrode is only applicable to flat end mills.

The third category of orbit path is the square orbit, which is the most commonly used polygonal planar orbit in Sink EDM. Square orbits produce superior results because they are capable of creating corner radii as small as the finish spark gap in the final cavity. Square orbits also do not cause the sharp corners in the electrode thereby increase electrode longevity. However, designing an electrode for a square orbit is very complicated except in very simple cases. And hence, it is very seldom employed.

FIG. 1 is an orthogonal orientation depicting a prior art technique to undersize an electrode to account for orbital path and spark gap, under-sizing the programmed tools is done manually to account for spark gap and orbit size. For example, a user desires to mill an electrode 100 and uses a cylindrical tool 105, to that end. The tool is 40 millimeters long and 10 millimeters in diameter, for example. Given a spark gap of 0.02 millimeters, and an orbit size of 0.1 millimeter, the user "cheats" the CAM system by programming the tool to be 10 mm−2(spark gap+orbit size), or 9.76 mm. Likewise the length is shortened by just the spark gap to result in 39.98 mm (40 mm−0.02 mm) programmed tool length. Therefore, the milling machine thinks it is using a programmed tool 110, but it is really using the cylindrical tool 105.

There is a need for a solution that can easily undersize electrodes for polygonal orbits to produce sharp corners and without needed manual modification to trick the tools in manufacturing the electrodes.

SUMMARY

To overcome the limitations in the prior art described above, and to overcome other limitations that will become apparent upon reading in accordance with the purpose of the presently preferred embodiment as broadly described herein, the presently preferred embodiment discloses a method for designing an electrode for electric discharge machining, the method comprising identifying a cavity in a three-dimensional design; calculating a direct negative boolean of said cavity to define a general form for an electrode; determining an orbit path for said electrode, wherein said orbit path has a plurality of vertices corresponding to a plurality of instances with said three-dimensional design; subtracting a plurality of instances from said general form for said electrode by boolean subtraction whereby an orbit gap is removed from said general form electrode; and applying a constant face offset to said general form for said electrode having said orbit gap. The method further comprising the step of adding tangential extensions to said electrode whereby said tangential extensions provide relief. The method, wherein said orbit path is polygonal. The method, wherein said orbit path is tessellated into a plurality of discrete vertices. The method, wherein said orbit path is polygonal and the method further comprises the step of adding tangential extensions whereby said tangential extensions provide relief. The method, wherein said orbit path is tessellated into a plurality of discrete vertices and the method further comprises the step of adding tangential extensions whereby said tangential extensions provide relief.

Another advantage of the presently preferred embodiment is to provide a computer-program product tangibly embodied in a machine readable medium to perform a method for designing an electrode for electric discharge machining, comprising instructions for identifying a cavity in a three-dimensional design; instructions for calculating a direct negative boolean of said cavity to define a general form for an electrode; instructions for determining an orbit path for said electrode, wherein said orbit path has a plurality of vertices corresponding to a plurality of instances with said three-dimensional design; instructions for subtracting a plurality of instances from said general form for said electrode by boolean subtraction whereby an orbit gap is removed from said general form for said electrode; and instructions for applying a constant face offset to said general form for said electrode having said orbit gap. The computer-program product, further comprising the instruction for adding tangential extensions whereby said tangential extensions provide relief. The computer-program product, wherein said orbit path is polygonal. The computer-program product, wherein said orbit path is tessellated into a plurality of discrete vertices. The computer-program product, wherein said orbit path is polygonal and the method further comprises the instruction for adding tangential extensions whereby said tangential extensions provide relief. The computer-program product, wherein said orbit path is tessellated into a plurality of discrete vertices and the method further comprises the instruction for adding tangential extensions whereby said tangential extensions provide relief.

Another advantage of the presently preferred embodiment is a computer data signal for computer aided modeling, said computer data signal comprising code configured to cause a designer to implement on a computer to employ a method comprising generating an electrode design from a general form for an electrode having an orbit path with a plurality of instances directly related to a plurality of vertices of said orbit path, where a boolean subtraction of said plurality of instances defines an orbit gap, wherein said electrode design is said general form for said electrode less said orbit gap and a constant face offset; formatting signals to transmit to a milling machine to form a physical electrode based on said under-sized electrode; utilizing said physical electrode to erode a cavity in an electrically conductive physical workpiece.

Still another advantage of the presently preferred embodiment is an electrode for eroding an electronically conductive workpiece to form a cavity by die-sinking, wherein a software application computes said electrode such that said electrode is a negative of said cavity less an orbit gap and a constant face offset, wherein said orbit gap is calculated from an orbit path having a plurality of vertices.

And yet another advantage of the presently preferred embodiment is a molded part formed by a core and a cavity wherein said core and said cavity are milled by at least electric discharge machining having an electrode designed by a software application such that said electrode is a negative of a design cavity less an orbit gap and a constant face offset.

A further advantage of the presently preferred embodiment is a data processing system having at least a processor and accessible memory, comprising means for identifying a cavity in a three-dimensional design; means for calculating a direct negative boolean of said cavity to define a general form for an electrode; means for determining an orbit path for said electrode, wherein said orbit path has a plurality of vertices corresponding to a plurality of instances with said three-dimensional design; means for subtracting a plurality of instances from said general form for said electrode by boolean subtraction whereby an orbit gap is removed from said general form electrode; and means for applying a constant face offset to said general form for said electrode having said orbit gap.

Other advantages of the presently preferred embodiment will be set forth in part in the description and in the drawings that follow, and, in part will be learned by practice of the presently preferred embodiment.

The presently preferred embodiment will now be described with reference made to the following Figures that form a part hereof, and which is shown, by way of illustration, an embodiment of the presently preferred embodiment. It is understood that other embodiments may be utilized and changes may be made without departing from the scope of the presently preferred embodiment.

BRIEF DESCRIPTION OF THE DRAWINGS

A preferred exemplary embodiment of the presently preferred embodiment will hereinafter be described in conjunction with the appended drawings, wherein like designations denote like elements, and.

DETAILED DESCRIPTION OF THE PREFERRED EMBODIMENTS

Figure 1:
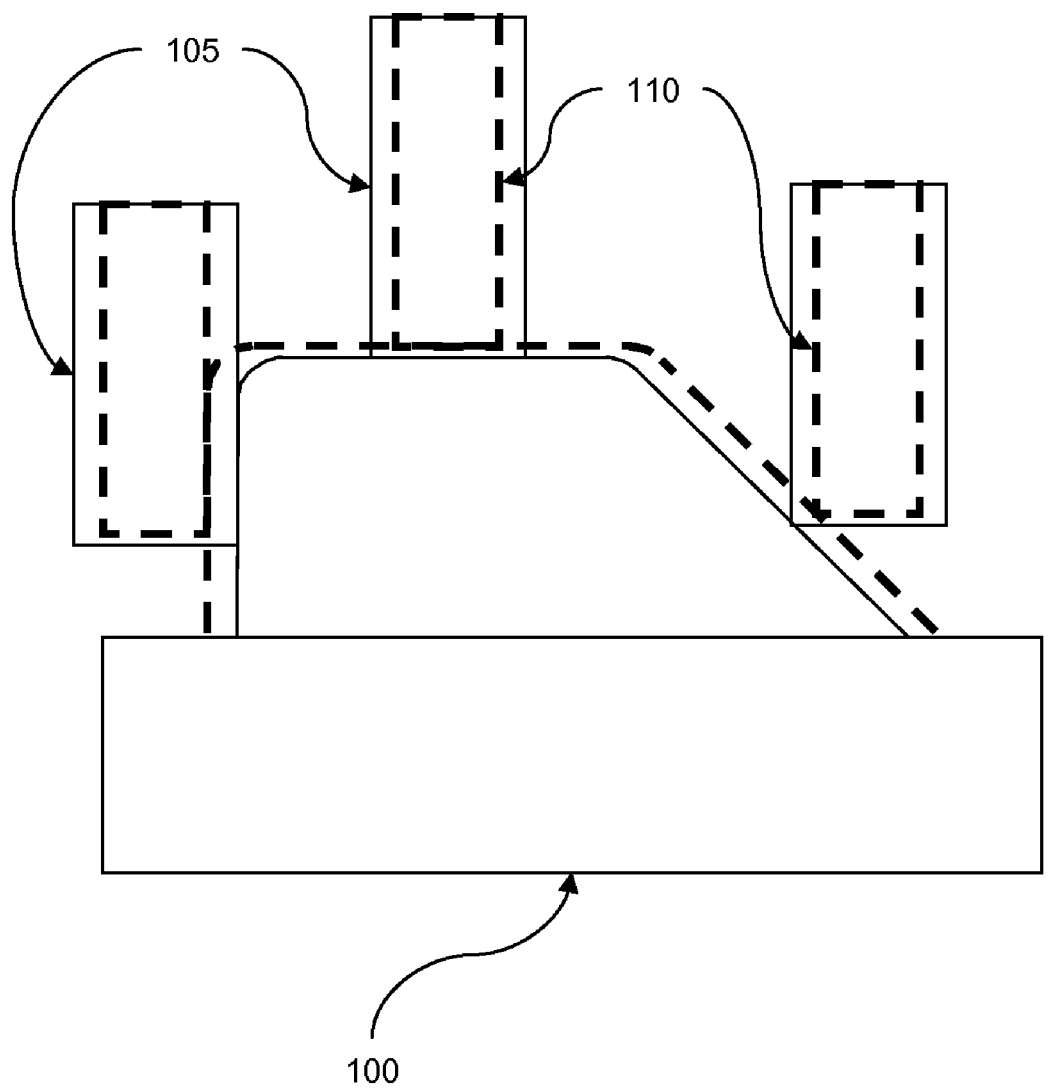
FIG. 1 is an orthogonal orientation depicting a prior art technique to under-size an electrode to account for orbital path and spark gap.
Figure 2:
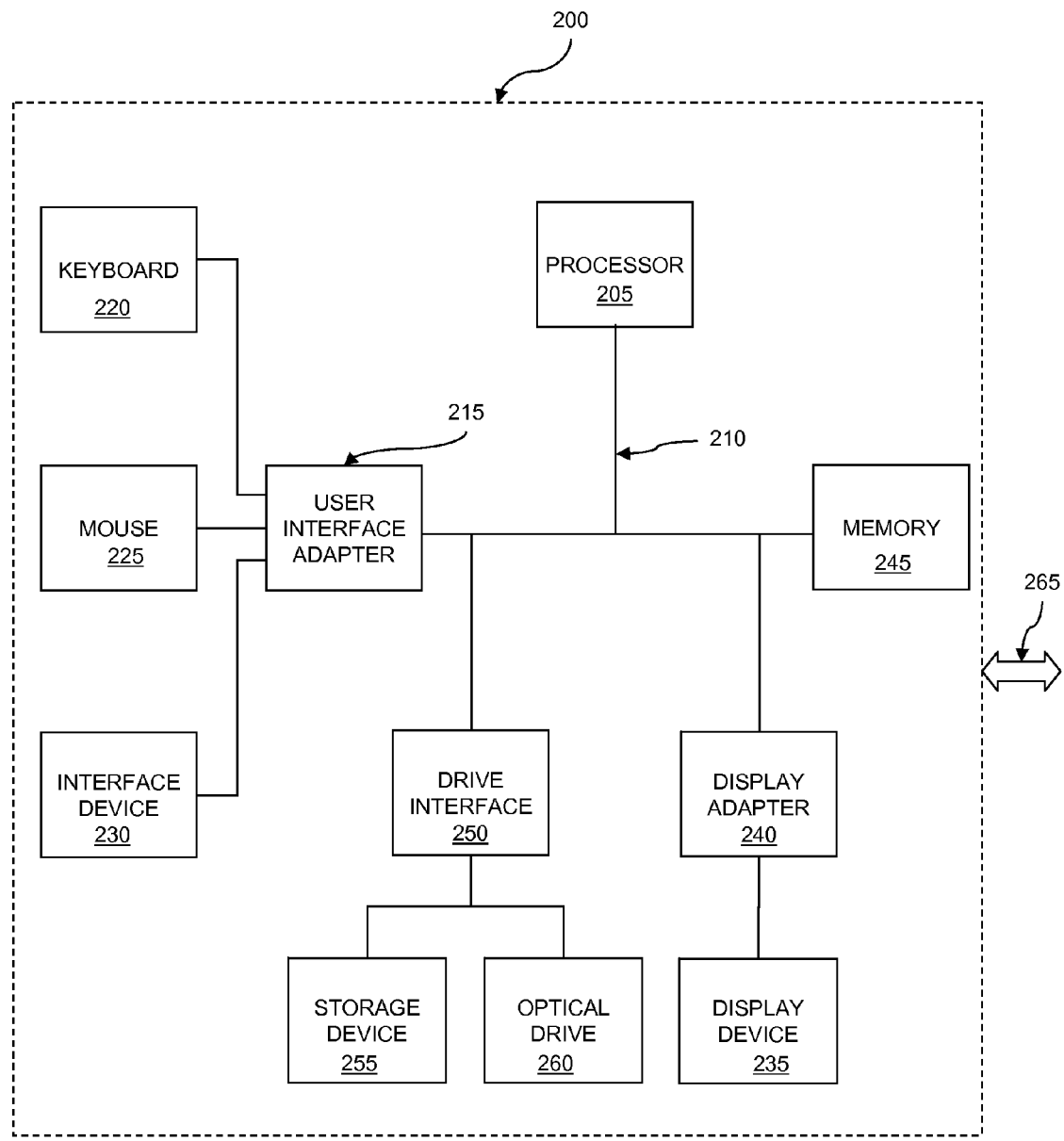
FIG. 2 is a block diagram of a computer environment in which the presently preferred embodiment may be practiced.

The numerous innovative teachings of the present application will be discussed with particular reference to the presently preferred embodiments. It should be understood, however, that this class of embodiments provides only a few examples of the many advantageous uses of the innovative teaching herein. The presently preferred embodiments provide, among other things, a system and method for undersizing electrodes for polygonal orbit electrical discharge machining. FIG. 2 and the following discussion are intended to provide a brief, general description of a suitable computing environment in which the presently preferred embodiments may be implemented. Although not required, the presently preferred embodiments will be described in the general context of computer-executable instructions, such as program modules, being executed by a personal computer. Generally program modules include routines, programs, objects, components, data structures, etc., that perform particular tasks or implement particular abstract data types. Likewise, the presently preferred embodiment may be performed in any of a variety of known computing environments.

With reference to FIG. 2, an exemplary system for implementing the presently preferred embodiments includes a general-purpose computing device in the form of a computer 200, such as a desktop or laptop computer, including a plurality of related peripheral devices (not depicted). The computer 200 includes a microprocessor 205 and a bus 210 employed to connect and enable communication between the microprocessor 205 and a plurality of components of the computer 200 in accordance with known techniques. The bus 210 may be any of several types of bus structures including a memory bus or memory controller, a peripheral bus, and a local bus using any of a variety of bus architectures. The computer 200 typically includes a user interface adapter 215, which connects the microprocessor 205 via the bus 210 to one or more interface devices, such as a keyboard 220, mouse 225, and/or other interface devices 230, which can be any user interface device, such as a touch sensitive screen, digitized pen entry pad, etc. The bus 210 also connects a display device 235, such as an LCD screen or monitor, to the microprocessor 205 via a display adapter 240. The bus 210 also connects the microprocessor 205 to a memory 245, which can include ROM, RAM, etc.

The computer 200 further includes a drive interface 250 that couples at least one storage device 255 and/or at least one optical drive 260 to the bus. The storage device 255 can include a hard disk drive, not shown, for reading and writing to a disk, a magnetic disk drive, not shown, for reading from or writing to a removable magnetic disk drive. Likewise the optical drive 260 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 200.

The computer 200 can communicate via a communications channel 265 with other computers or networks of computers. The computer 200 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 245 of the computer 200. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 3:
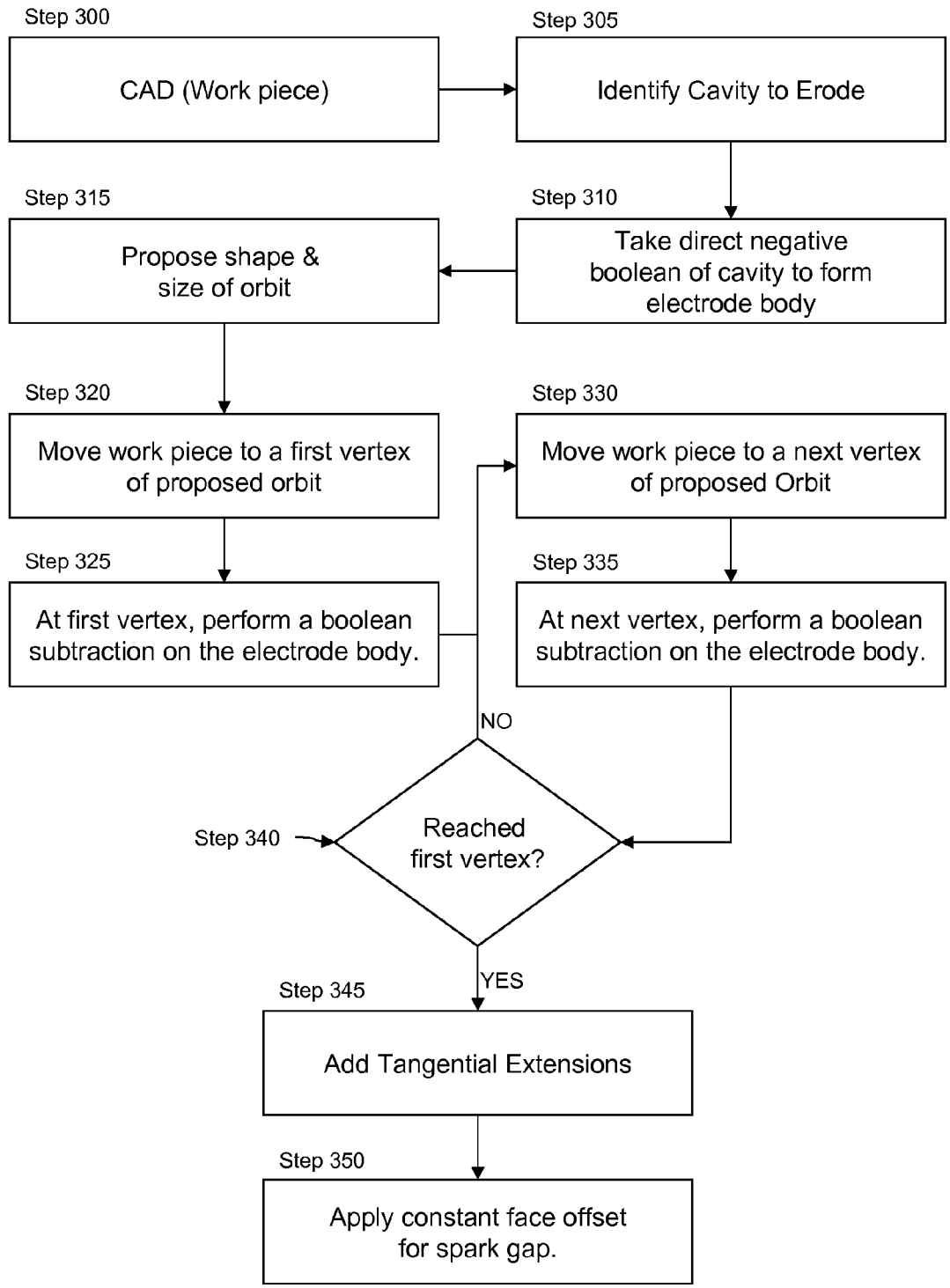
FIG. 3 is a logic flow diagram depicting a method disclosed in the preferred embodiment.
Figure 4:
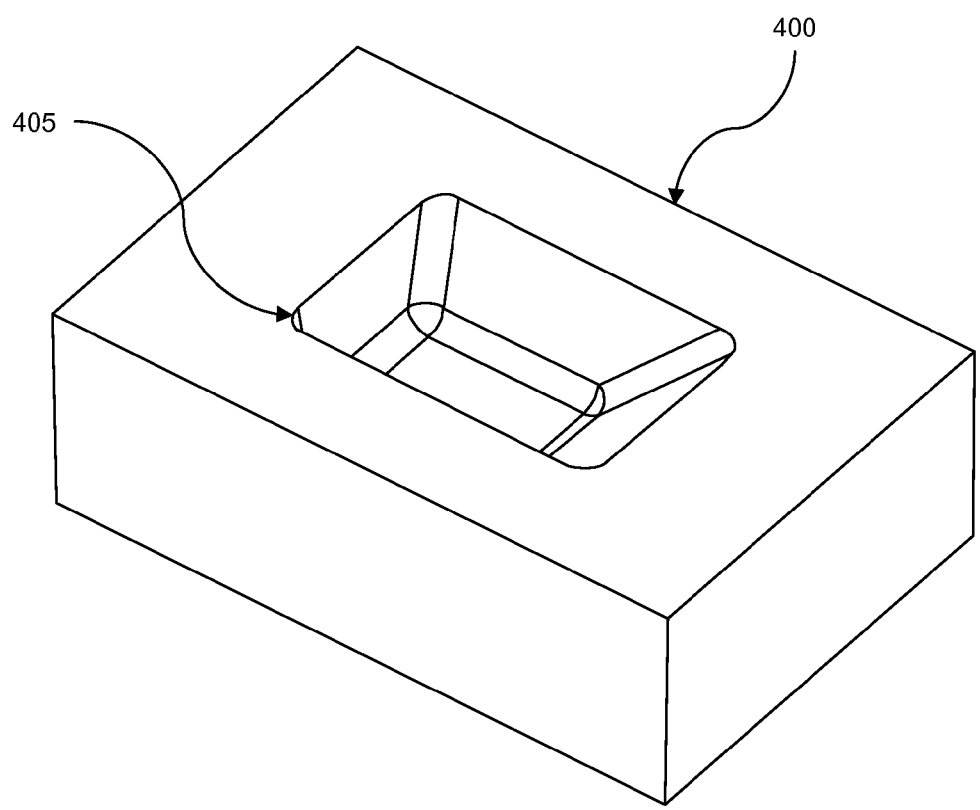
FIG. 4 is a three-dimensional design of a workpiece.
Figure 5:
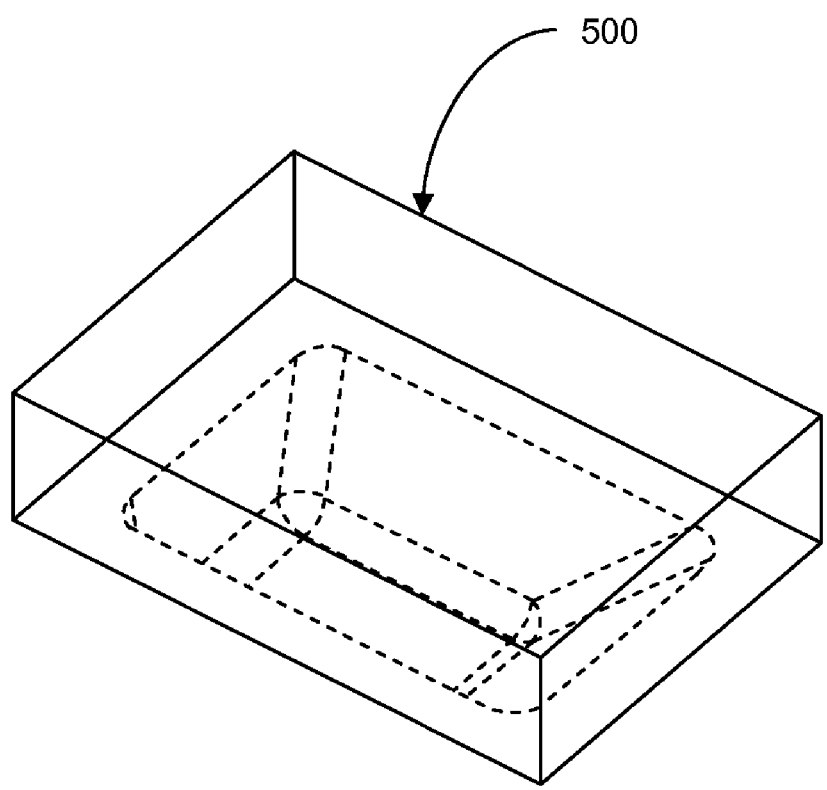
FIG. 5 is an illustration of an electrode body that has a direct boolean negative of a cavity in a three-dimensional design of a workpiece extending therefrom.
Figure 6A:
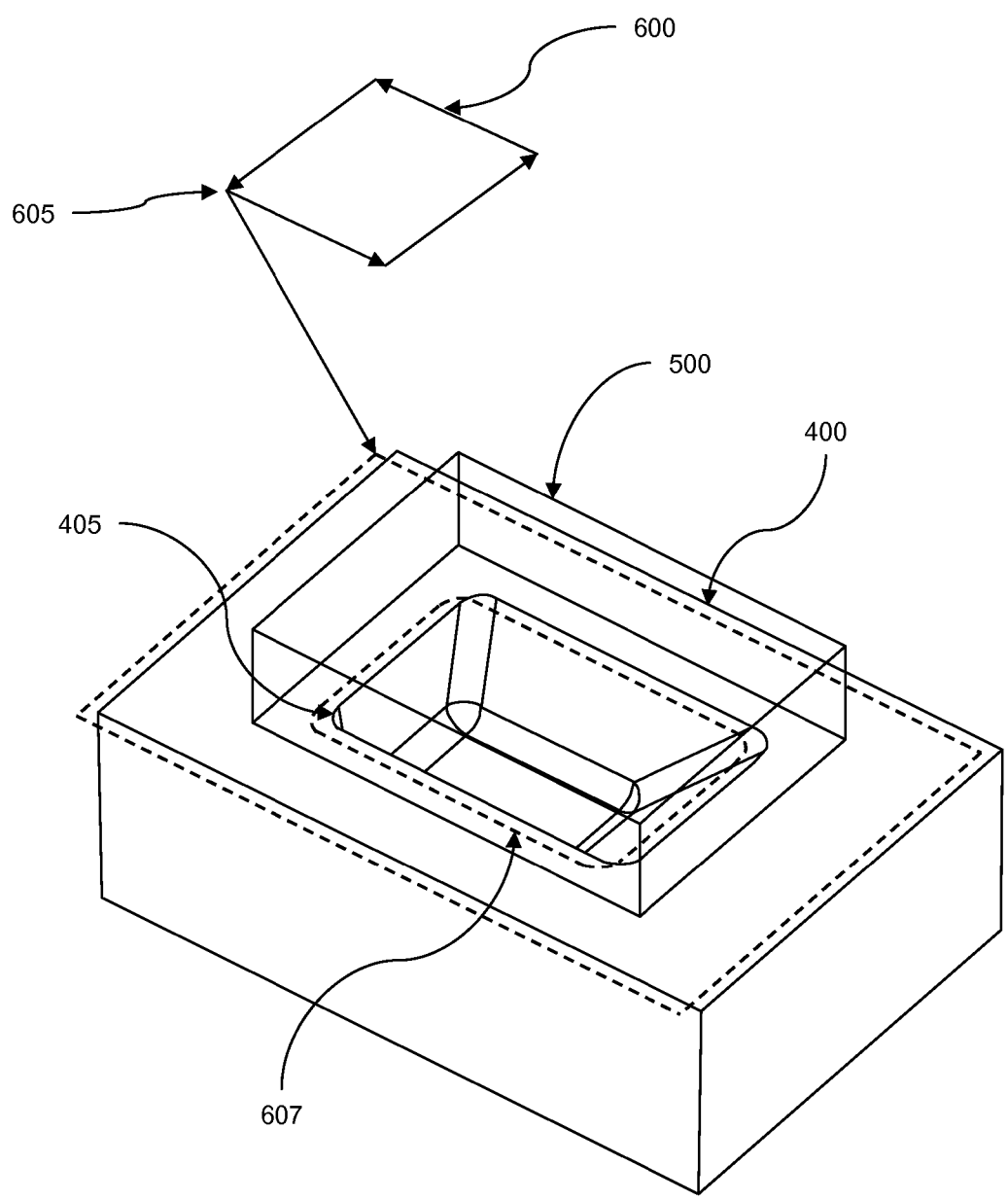
FIG. 6a-6d is a series of illustrations depicting the formation of an electrode formed following the method disclosed.
Figure 6B:
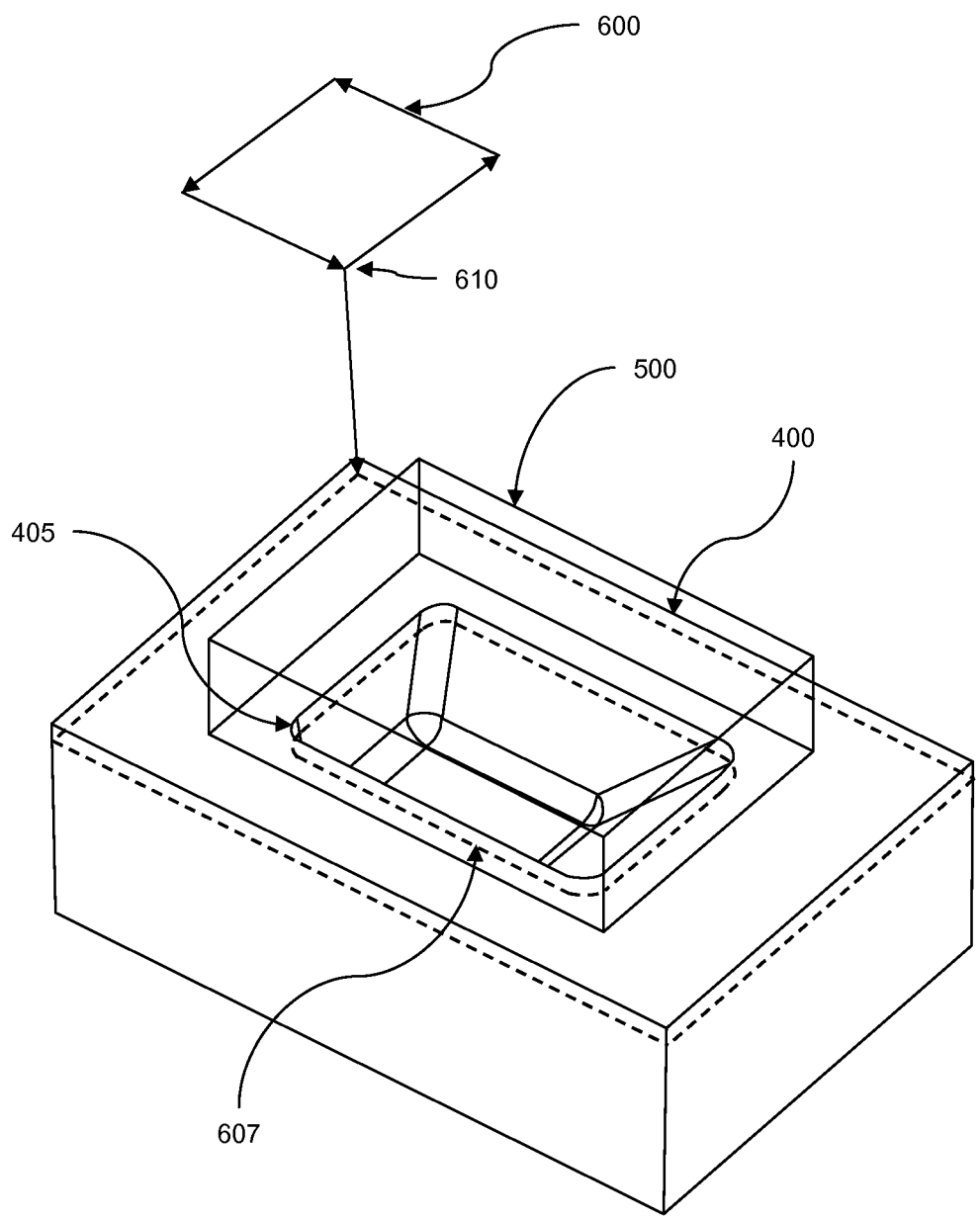
Figure 6C:
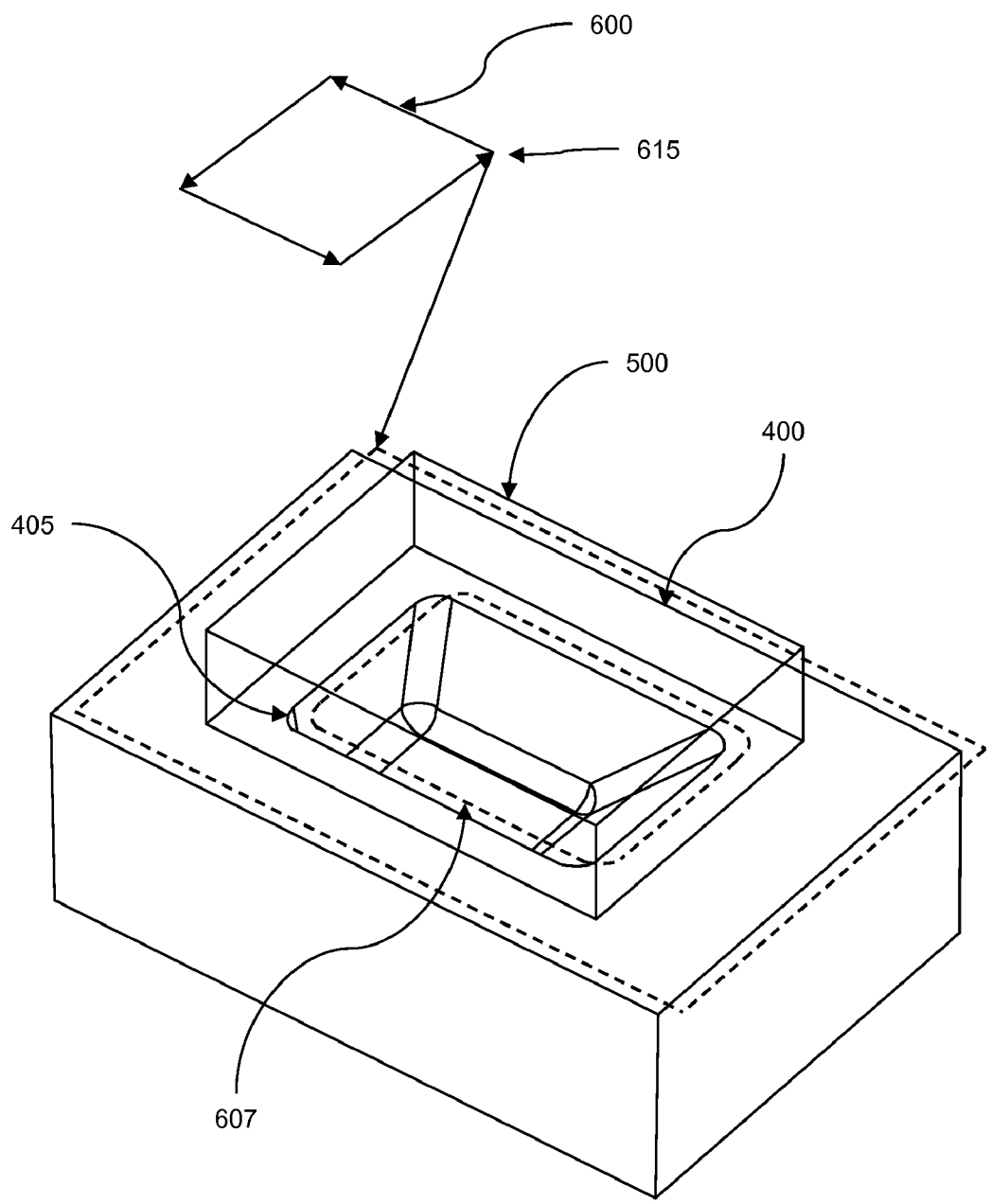
Figure 6D:
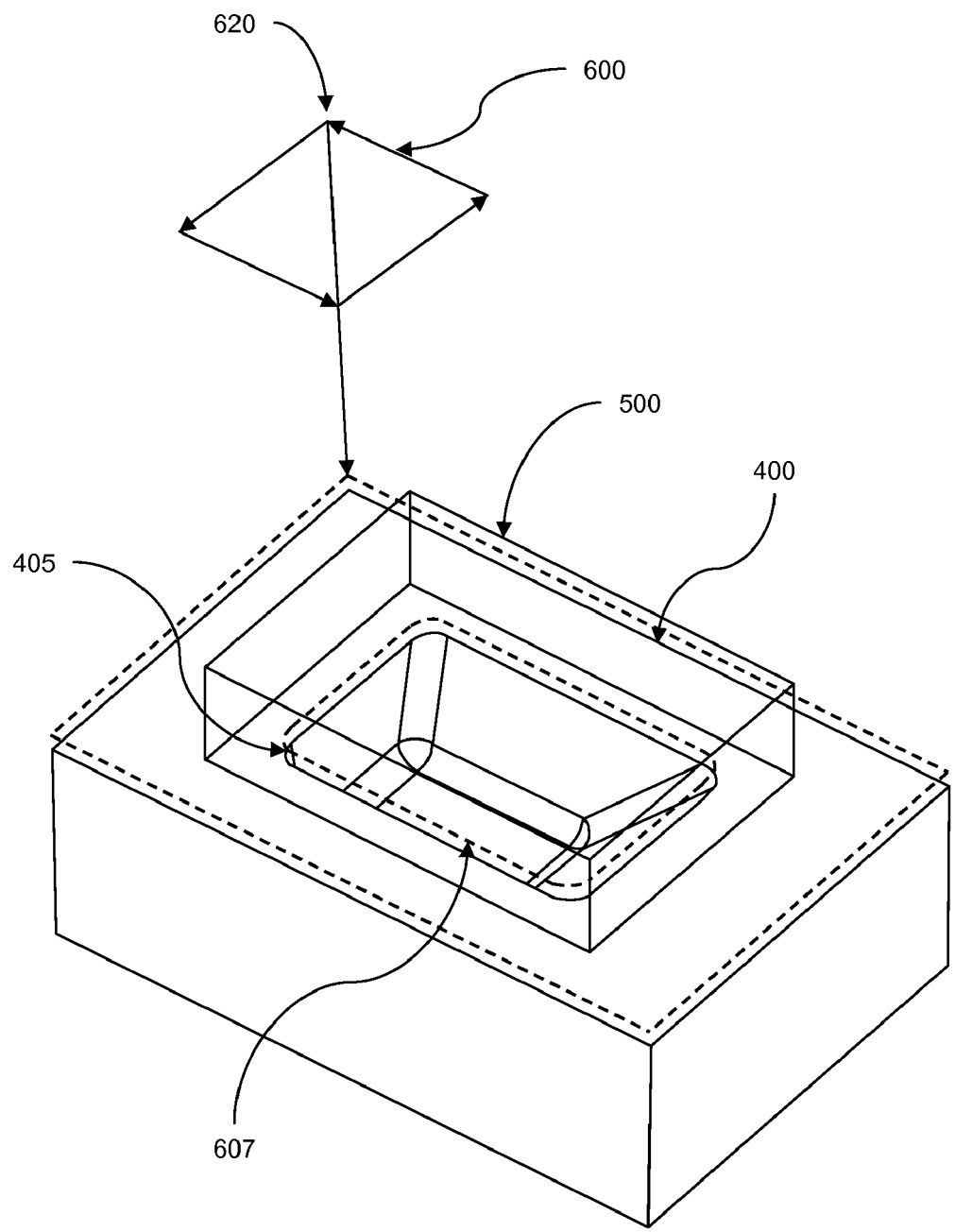
Figure 7:
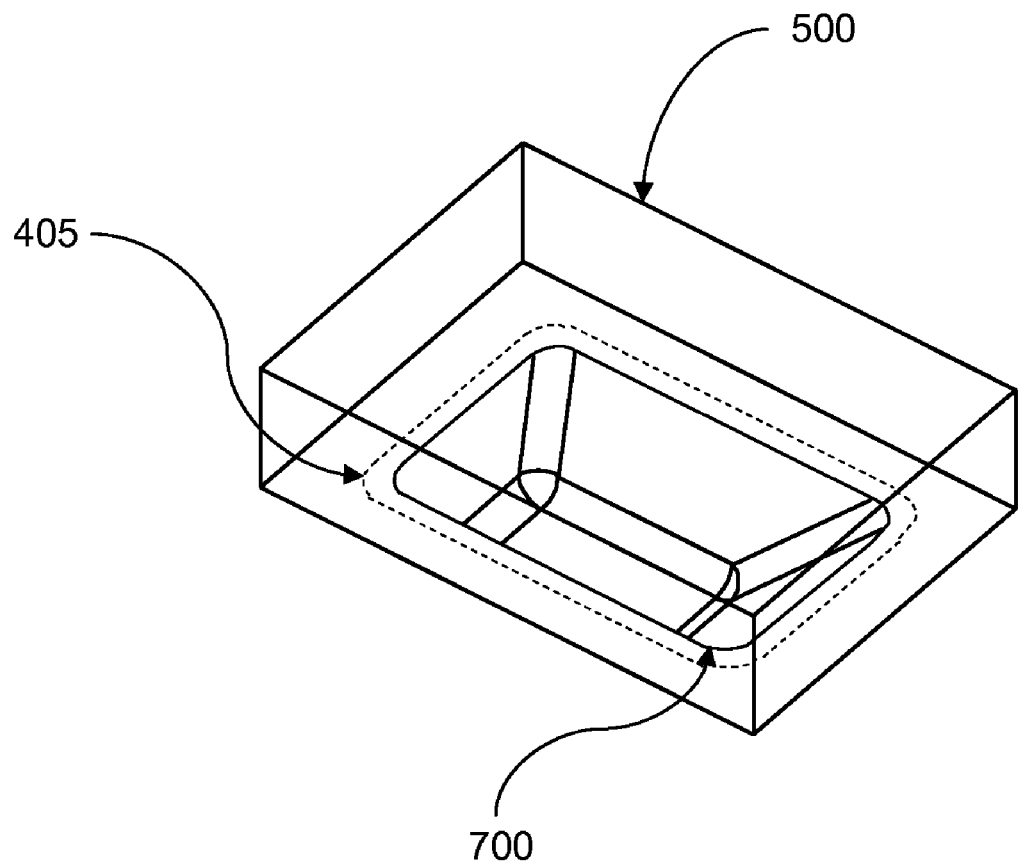
FIG. 7 is an axonometric orientation for an electrode undersized for orbit.

The presently preferred embodiment discloses a method for designing an electrode for eroding an electrically conductive workpiece to form a cavity therein. Referring now to the steps illustrated in FIG. 3 and cross-referencing those steps with illustrative examples in the subsequent figures FIG. 4 through FIG. 10, a designer begins by creating a three-dimensional design 400 of a virtual workpiece utilizing a computer aided drafting software application, like NX(tm) by UGS Corp. (Step 300). The designer then identifies a cavity 405 to erode utilizing a process of electro-erosion known as electrical discharge machining (EDM) by die sinking (Step 305).

Continuing, an electrode 500 is designed beginning with an electrode starting block and the direct negative boolean of the cavity 405, which results in the electrode starting block with a direct negative boolean of the cavity extending therefrom (Step 310). Next determine the size and shape of the orbit in roughing and finishing EDM processes, where the shape of the orbit approximately resembles the cavity itself (Step 315). The presently preferred embodiment discloses a polygonal orbit, however it is understood that the polygonal orbit can have many sides and many vertices. For example, the presently preferred embodiment can be utilized with circular orbits by tessellating the circle into a polygon, or any orbital path that can be deconstructed into discrete points.

Now to under-size the electrode, given a square orbit 600 as proposed by the designer based upon the square-like nature of the cavity to be milled, the three-dimensional design 400 is moved to a first vertex 605 in a manner that orbits the cavity 405 itself, instead of the electrode, in the desired path (Step 320). At the first vertex 605, the three-dimensional design 400 performs a boolean-subtraction operation on the electrode 500 from an instance 607, where an the instance denotes an associated copy of the same part at a different location (Step 325). The three-dimensional design 400 is moved to a next vertex 610 of the square orbit 600 (Step 330), after which another boolean-subtraction operation on the electrode 500 occurs (Step 335). Successive boolean-subtraction operations occur on the electrode 500 at each subsequent vertex 615, 620 until the first vertex 605 is reached (Step 340).

Figure 8:
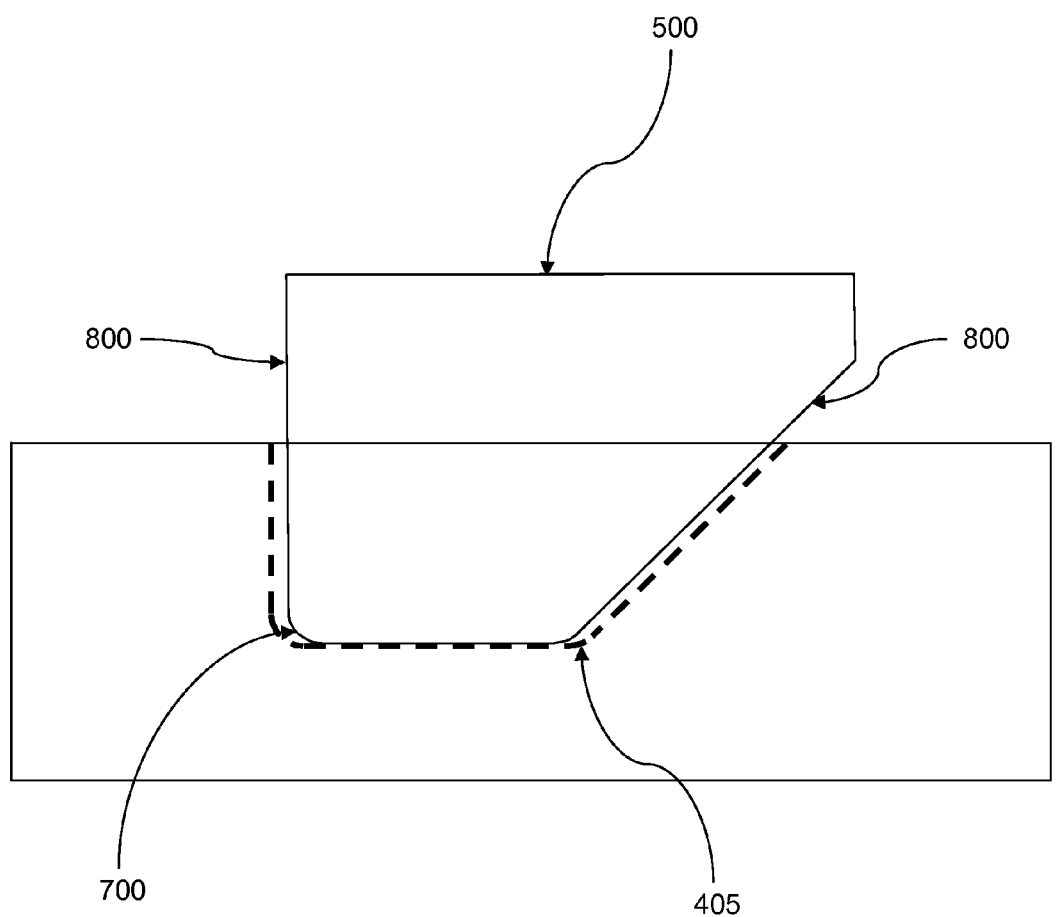
FIG. 8 is an orthogonal orientation for an electrode undersized for orbit in a work piece.
Figure 9:
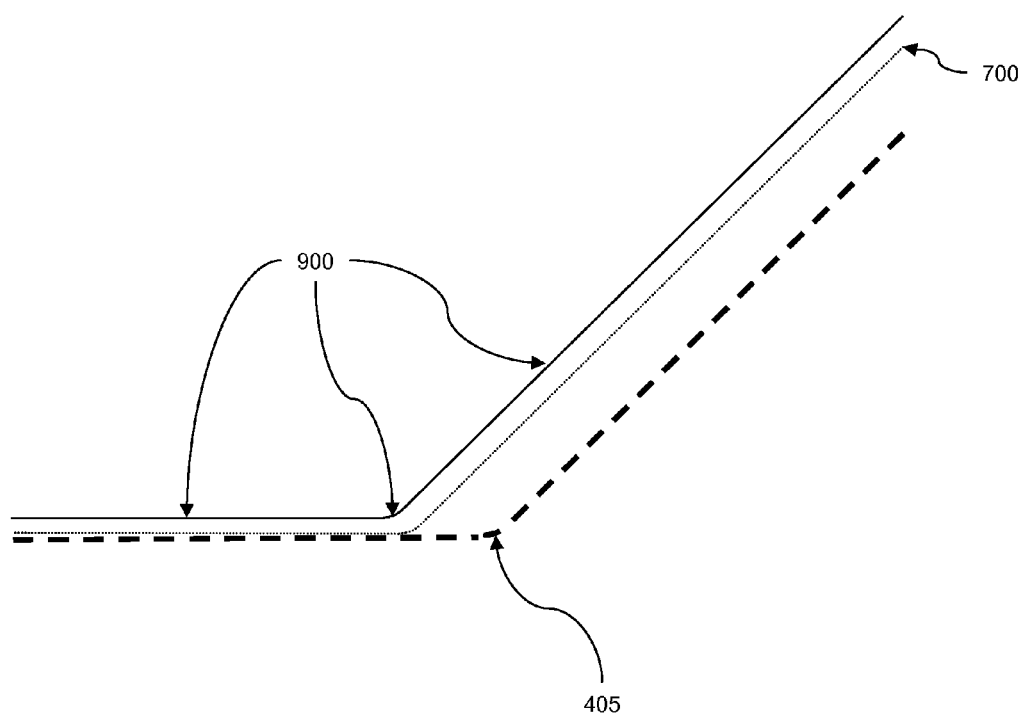
FIG. 9 is a close-up in an orthogonal orientation for an electrode undersized for orbit and spark gap.
Figure 10:
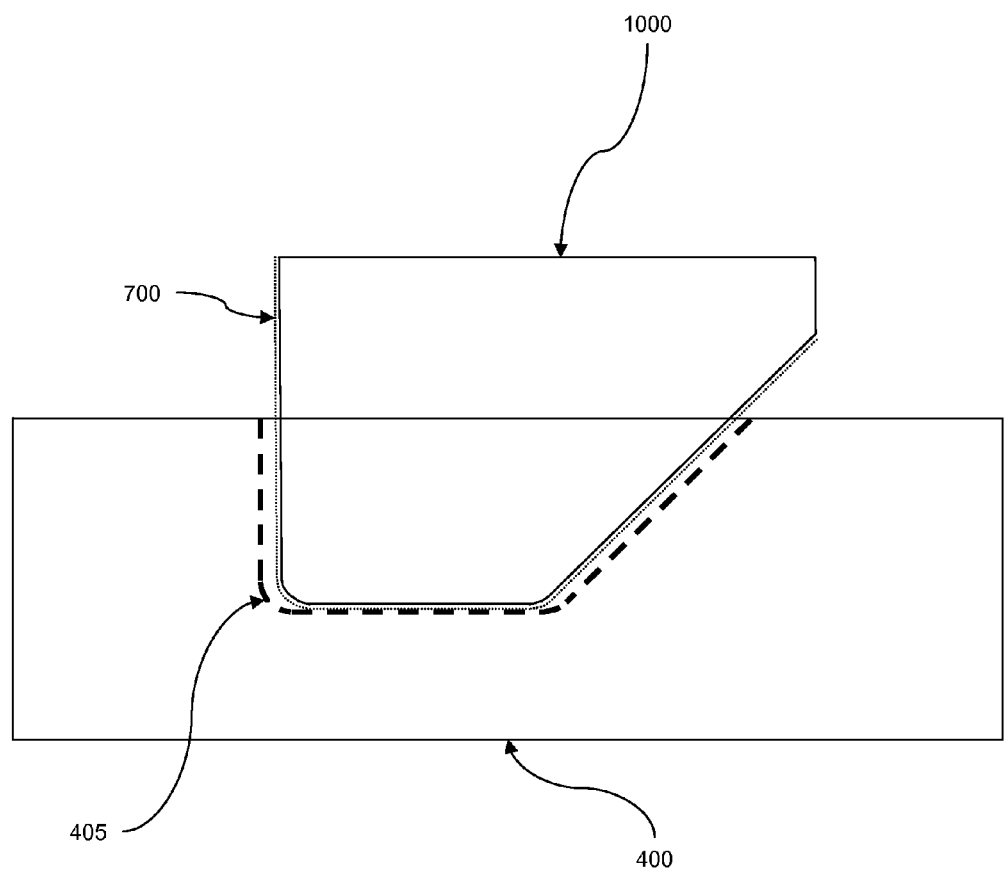
FIG. 10 is an orthogonal orientation for an electrode undersized for orbit and spark gap in a work piece.

An orbit gap 700, also identified as an orbit-adjusted electrode or an electrode offset, is the result of the foregoing steps where the presently preferred embodiment then further adds a plurality of tangential extensions shown at 800 from the corresponding edges of the cavity 405 to provide relief (Step 345). As depicted in FIG. 8, an orthogonal orientation for an electrode undersized for orbit in a work piece, it is important to note that at this step the orbital gaps are different on the vertical and inclined faces, and there are no gaps between the horizontal faces. Finally, a spark gap is formed by a constant face offset 900 applied to all faces to compensate for a predetermined spark-gap (Step 350) to create the end product of an undersized electrode 1000 for the proposed polygonal orbit.

In another embodiment, the electrode geometry is derived from a subset of faces from the cavity geometry. In such cases, the solution is still valid by creating a negative of the derived electrode and intersecting all of the instances of the electrode itself. Or put another way, the electrode is moved around and the alternative embodiment intersects all of the instances of the electrode itself.

Following the disclosed presently preferred embodiment, the electrode is milled using conventional techniques. And is put into production to erode the necessary electrically conductive workpiece. The electrically conductive workpiece is used in physical manufacturing to create a core and a cavity that will be used for a manufacturing technique, like injection molding for example, to make parts.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the presently preferred embodiment have been described. It will be understood that various modifications may be made without departing from the spirit and scope of the presently preferred embodiment. Therefore, other implementations are within the scope of the following claims.

What is claimed is:

1. A computer implemented method for designing an electrode for electric discharge machining, the method comprising:

identifying a cavity in a three-dimensional design;
   calculating a direct negative boolean of said cavity to define a general form for an electrode;
   determining an orbit path for said electrode, wherein said orbit path has a plurality of vertices corresponding to a plurality of instances with said three-dimensional design;
   subtracting a plurality of instances from said general form for said electrode whereby an orbit gap is removed from said general form electrode; and
   applying a constant face offset to said general form for said electrode having said orbit gap.

2. The method of claim 1, further comprising the step of adding tangential extensions to said electrode whereby said tangential extensions provide relief.

3. The method of claim 1, wherein said orbit path is polygonal.

4. The method of claim 1, wherein said orbit path is tessellated into a plurality of discrete vertices.

5. The method of claim 1, wherein said orbit path is polygonal and the method further comprises the step of adding tangential extensions whereby said tangential extensions provide relief.

6. The method of claim 1, wherein said orbit path is tessellated into a plurality of discrete vertices and the method further comprises the step of adding tangential extensions whereby said tangential extensions provide relief.

7. The method of claim 1, wherein said step of subtracting is boolean subtraction.

8. A computer-program product tangibly embodied in a machine readable medium to perform a method for designing an electrode for electric discharge machining, comprising:

instructions for identifying a cavity in a three-dimensional design;
   instructions for calculating a direct negative boolean of said cavity to define a general form for an electrode;
   instructions for determining an orbit path for said electrode, wherein said orbit path has a plurality of vertices corresponding to a plurality of instances with said three-dimensional design;
   instructions for subtracting a plurality of instances from said general form for said electrode whereby an orbit gap is removed from said general form for said electrode; and
   instructions for applying a constant face offset to said general form for said electrode having said orbit gap.

9. The computer-program product of claim 8, further comprising the instruction for adding tangential extensions whereby said tangential extensions provide relief.

10. The computer-program product of claim 8, wherein said orbit path is polygonal.

11. The computer-program product of claim 8, wherein said orbit path is tessellated into a plurality of discrete vertices.

12. The computer-program product of claim 8, wherein said orbit path is polygonal and the method further comprises the instruction for adding tangential extensions whereby said tangential extensions provide relief.

13. The computer-program product of claim 8, wherein said orbit path is tessellated into a plurality of discrete vertices and the method further comprises the instruction for adding tangential extensions whereby said tangential extensions provide relief.

14. The computer-program product of claim 8, wherein said instruction for subtracting is by boolean subtraction.

15. An electrode for eroding an electronically conductive workpiece to form a cavity by die-sinking, wherein a software application:

(a) identifies a design cavity in a three-dimensional design;

(b) calculates a direct negative boolean of said design cavity to define a general form for said electrode;

(c) determines an orbit path for said electrode, wherein said orbit path has a plurality of vertices corresponding to a plurality of instances with said three-dimensional design;

(d) removes an orbit gap from said general form for said electrode by subtracting a plurality of instances from said general form; and (e) applies a constant face offset from said general form for said electrode.

16. A molded part formed by a core and a cavity wherein said core and said cavity are milled by at least electric discharge machining having an electrode designed by a software application, wherein said software application:

(a) identifies a design cavity in a three-dimensional design;

(b) calculates a direct negative boolean of said design cavity to define a general form for said electrode;

(c) determines an orbit path for said electrode, wherein said orbit path has a plurality of vertices corresponding to a plurality of instances with said three-dimensional design;

(d) removes an orbit gap from said general form for said electrode by subtracting a plurality of instances from said general form; and (e) applies a constant face offset from said general form for said electrode.

17. A data processing system having at least a processor and accessible memory, comprising:

means for identifying a cavity in a three-dimensional design;

means for calculating a direct negative boolean of said cavity to define a general form for an electrode;

means for determining an orbit path for said electrode, wherein said orbit path has a plurality of vertices corresponding to a plurality of instances with said three-dimensional design;

means for subtracting a plurality of instances from said general form for said electrode by boolean subtraction whereby an orbit gap is removed from said general form electrode; and means for applying a constant face offset to said general form for said electrode having said orbit gap.

* * * * *